(12) United States Patent
Nakayama et al.

(10) Patent No.: US 10,193,409 B2
(45) Date of Patent: Jan. 29, 2019

(54) STATOR FOR ROTATING ELECTRIC MACHINE, ROTATING ELECTRIC MACHINE EQUIPPED WITH SAME, AND MANUFACTURING METHODS THEREFOR

(71) Applicant: Hitachi Automotive Systems, Ltd., Hitachinaka-shi, Ibaraki (JP)

(72) Inventors: Kenichi Nakayama, Hitachinaka (JP); Tomohiro Fukuda, Hitachinaka (JP); Hisaya Shimizu, Hitachinaka (JP); Shin Onose, Hitachinaka (JP); Kazuo Ojima, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 398 days.

(21) Appl. No.: 15/109,231

(22) PCT Filed: Nov. 26, 2014

(86) PCT No.: PCT/JP2014/081133
§ 371 (c)(1),
(2) Date: Jun. 30, 2016

(87) PCT Pub. No.: WO2015/104911
PCT Pub. Date: Jul. 16, 2015

(65) Prior Publication Data
US 2016/0329773 A1 Nov. 10, 2016

(30) Foreign Application Priority Data
Jan. 7, 2014 (JP) .................. 2014-000705

(51) Int. Cl.
*H02K 11/00* (2016.01)
*H02K 5/22* (2006.01)
(Continued)

(52) U.S. Cl.
CPC ............ *H02K 5/225* (2013.01); *H01R 4/182* (2013.01); *H01R 11/12* (2013.01); *H02K 3/02* (2013.01);
(Continued)

(58) Field of Classification Search
CPC ...... H02K 5/225; H02K 3/50; H02K 15/0068; H02K 15/02; H01R 4/182; H01R 11/12
(Continued)

(56) References Cited

U.S. PATENT DOCUMENTS

| 5,762,526 A * | 6/1998 | Kuramoto ............. F04C 23/008 439/874 |
| 2003/0129856 A1* | 7/2003 | Takizawa ................. H02K 3/50 439/13 |

(Continued)

FOREIGN PATENT DOCUMENTS

| JP | 52-121682 | 9/1977 |
| JP | 63-121276 A | 5/1988 |

(Continued)

OTHER PUBLICATIONS

International Search Report (PCT/ISA/210) issued in PCT Application No. PCT/JP2014/081133 dated Feb. 10, 2015 with English translation (Four (4) pages).

(Continued)

*Primary Examiner* — Thanh Lam
(74) *Attorney, Agent, or Firm* — Crowell & Moring LLP

(57) ABSTRACT

Provided is a stator for a rotating electric machine equipped with a connection terminal having high manufacturability and vibration resistance; also provided is a rotating electric machine equipped with this stator. The stator, which is for a rotating electric machine equipped with a stator coil, is equipped with a connection terminal. The connection terminal has a crimping part to which stator coil input/output coil conductors are connected, and a fastening part which is mechanically connected to an external mechanism, with a melt material arranged on the fastening part. The input/output coil conductors are configured so as to be connected (Continued)

to the connection terminal, with the melt material provided on the crimping part therebetween.

10 Claims, 12 Drawing Sheets

(51) Int. Cl.
*H01R 4/18* (2006.01)
*H01R 11/12* (2006.01)
*H02K 3/50* (2006.01)
*H02K 9/19* (2006.01)
*H02K 3/02* (2006.01)
*H02K 15/00* (2006.01)
*H02K 15/02* (2006.01)

(52) U.S. Cl.
CPC ............... *H02K 3/50* (2013.01); *H02K 9/19* (2013.01); *H02K 15/0068* (2013.01); *H02K 15/02* (2013.01); *H02K 2213/06* (2013.01)

(58) Field of Classification Search
USPC ............................... 310/71, 43; 29/596, 598
See application file for complete search history.

(56) References Cited

U.S. PATENT DOCUMENTS

| 2010/0066185 | A1* | 3/2010 | Kosaki | H02K 5/225 310/71 |
| 2013/0264898 | A1* | 10/2013 | Yamamoto | H02K 3/50 310/71 |
| 2013/0264899 | A1* | 10/2013 | Goto | H02K 3/50 310/71 |
| 2014/0154933 | A1* | 6/2014 | Miura | H02K 3/522 439/882 |

FOREIGN PATENT DOCUMENTS

| JP | 2-137306 A | 5/1990 |
| JP | 2008-305571 A | 12/2008 |
| JP | 2010-182492 A | 8/2010 |
| JP | 2011-181189 A | 9/2011 |

OTHER PUBLICATIONS

Japanese-language Written Opinion (PCT/ISA/237) issued in PCT Application No. PCT/JP2014/081133 dated Feb. 10, 2015 (Five (5) pages).

* cited by examiner

STATOR FOR ROTATING ELECTRIC MACHINE, ROTATING ELECTRIC MACHINE EQUIPPED WITH SAME, AND MANUFACTURING METHODS THEREFOR

TECHNICAL FIELD

The present invention relates to a stator of a rotating electric machine, a rotating electric machine including the same, and a manufacturing method for the stator and the rotating electric machine.

BACKGROUND ART

In forming a connection terminal, a brazing material is used so that a material to be connected such as a coil is temporarily fixed to the connection terminal. More specifically, in a copper plate included in the connection terminal, the brazing material is disposed in a part where the material to be connected is connected. The copper plate, the brazing material, and the material to be connected are put together to be subjected to resistance welding.

A known technology to improve productivity of the aforementioned process is a connection terminal that connects a copper plate with a brazing material. Such a connection terminal is obtained by forming a single or a plurality of projections on the copper plate, energizing the copper plate as sandwiching the same with electrodes of a resistance welder, and turning on electricity (for example, see PTL 1). Another known technology is a connection terminal including a clad material of which a part to be connected is connected to a brazing material in advance by pressurizing (for example, see PTL 2).

CITATION LIST

Patent Literature

PTL 1: JP 2011-181189 A
PTL 2: JP 02-137306 A

SUMMARY OF INVENTION

Technical Problem

According to a method disclosed in PTL 1, projections are formed to connect a brazing material. Therefore, a thickness of the brazing material or projecting parts of the projections may get stuck when inserting the coil, which may be a problem in further improvement of productivity.

According to a method disclosed in PTL 2, the brazing material may not get stuck with the coil. However, connection terminals for automobiles in recent years need to withstand increasingly severe operating conditions due to downsizing and the like. Therefore, connection terminals with higher aseismic capacity are desired. In spite of such a situation, the method disclosed in PTL 2 may be a problem in that a basic material may be deformed at a fastening portion.

An object of the present invention is to provide a stator of a rotating electric machine including a connection terminal with high productivity and aseismic capacity and to provide a rotating electric machine including the stator.

Solution to Problem

In order to solve the aforementioned problem, configurations according to claims of the present invention are adopted, for example.

The present disclosure includes a plurality of methods to solve the aforementioned problems. An example of such methods is as follows.

A stator of a rotating electric machine with a stator coil, includes: a connection terminal including a pressure connection portion and a fastening portion, the pressure connection portion being connected to an input/output coil conductor of the stator coil, the fastening portion being mechanically connected to an external system, wherein a melting material is disposed in the fastening portion.

Advantageous Effects of Invention

According to an embodiment of the present invention, it is possible to provide a stator of a rotating electric machine including a connection terminal with high productivity and aseismic capacity, and to provide a rotating electric machine including the stator.

Problems, configurations and effects other than those mentioned above will be clearly described with referring to descriptions of the following embodiment.

BRIEF DESCRIPTION. OF DRAWINGS

FIG. 3A shows one segment conductor, FIG. 3B shows how to form a coil with the segment conductors, and FIG. 3C shows where to dispose the segment conductors inside a slot.

Figure 11:
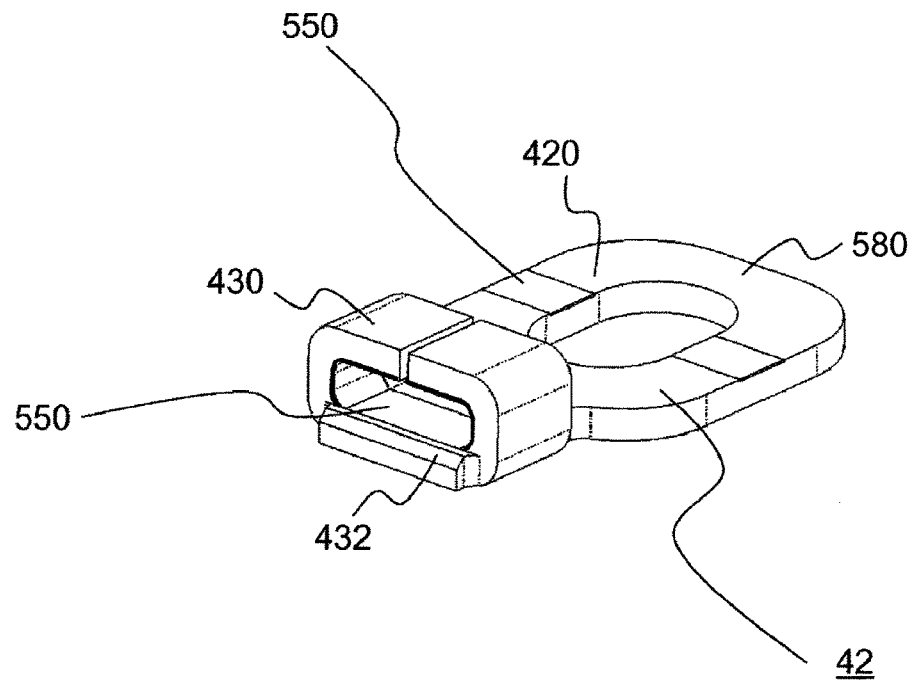
Figure 12:
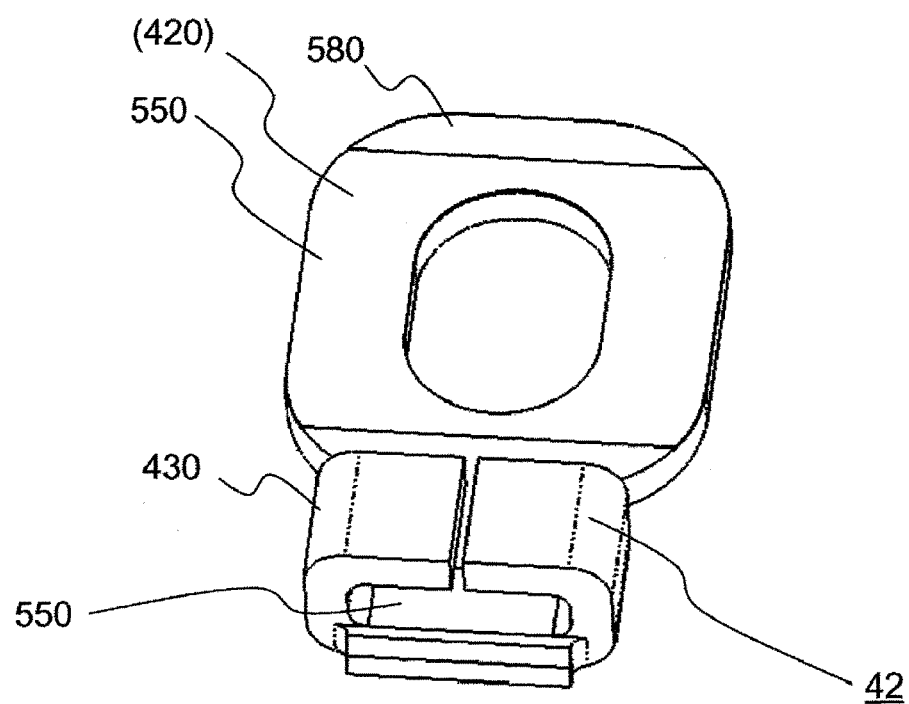
Figure 13:
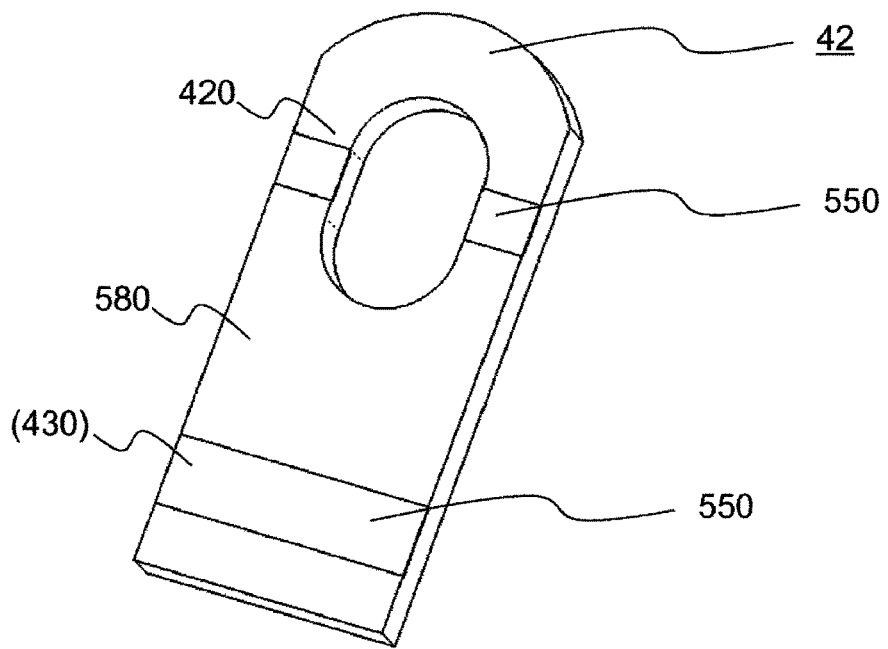
Figure 14:
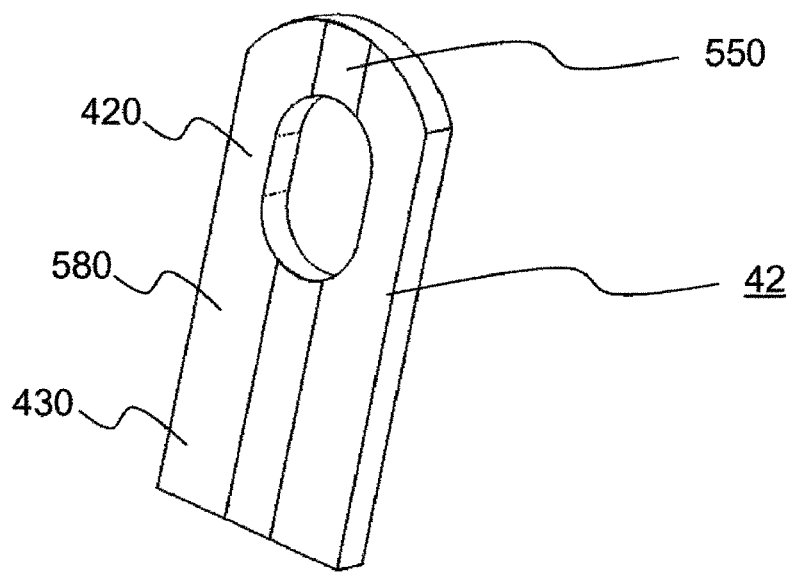
Figure 15:
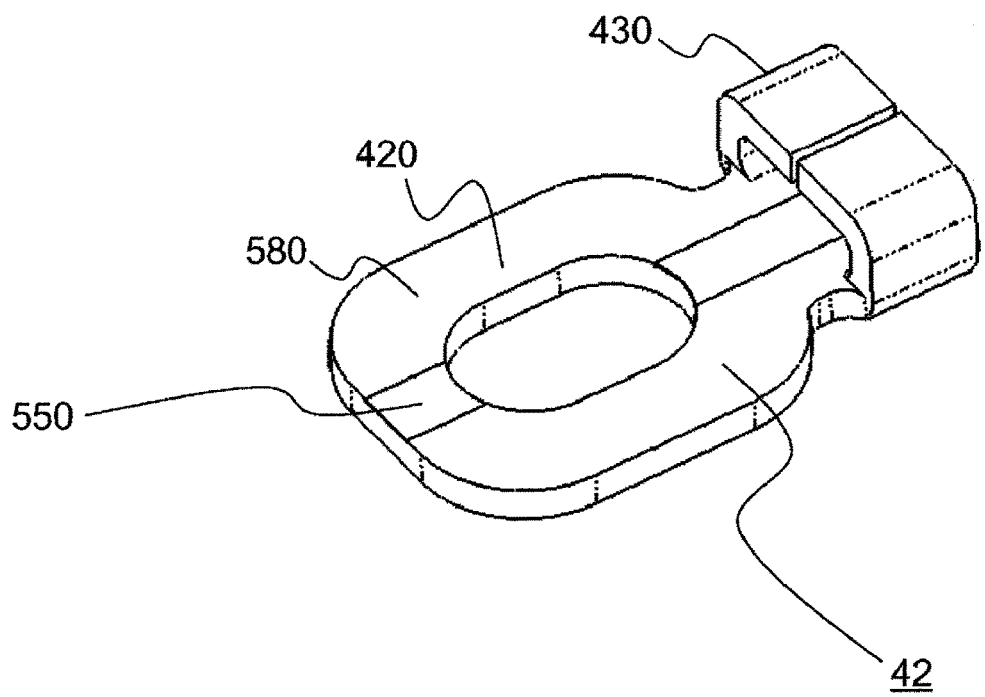
Figure 16:
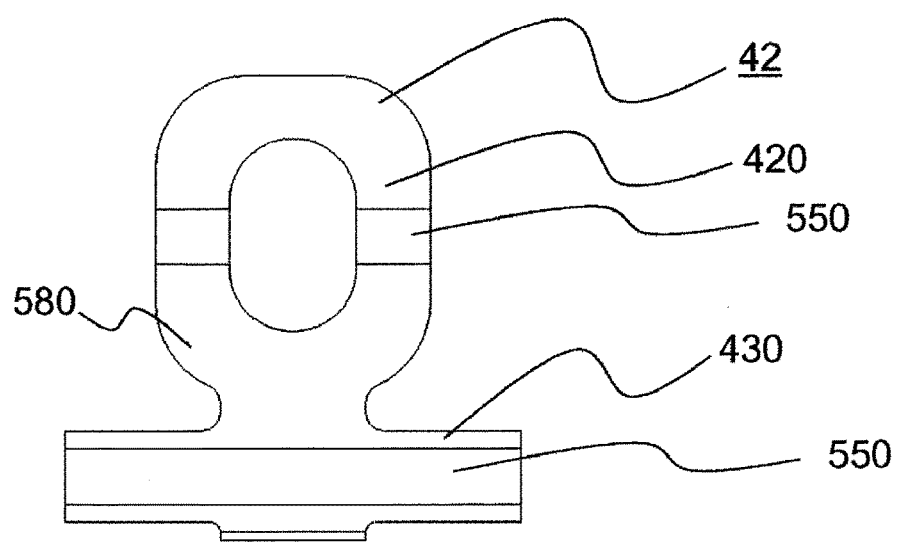
Figure 17:
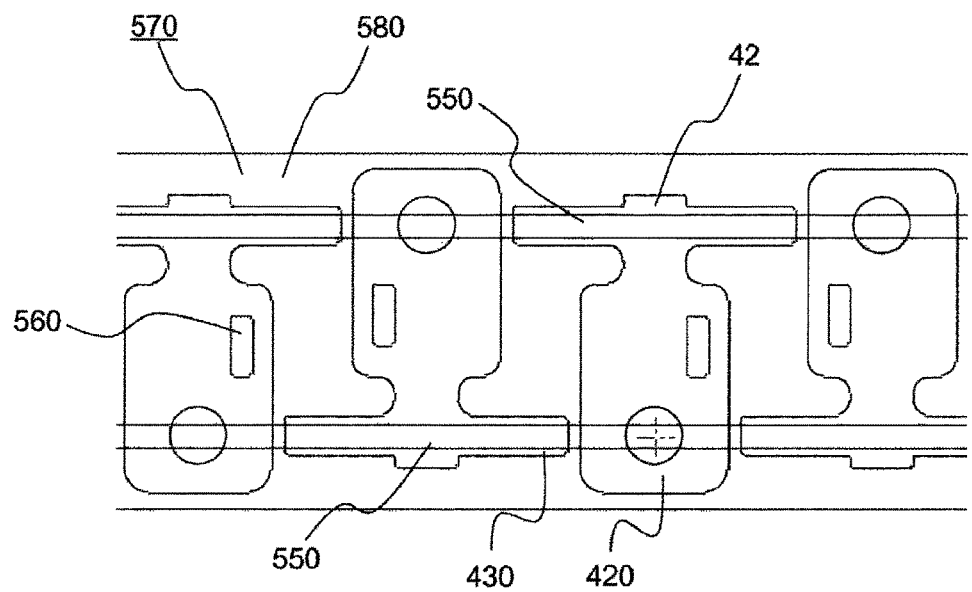
Figure 18:
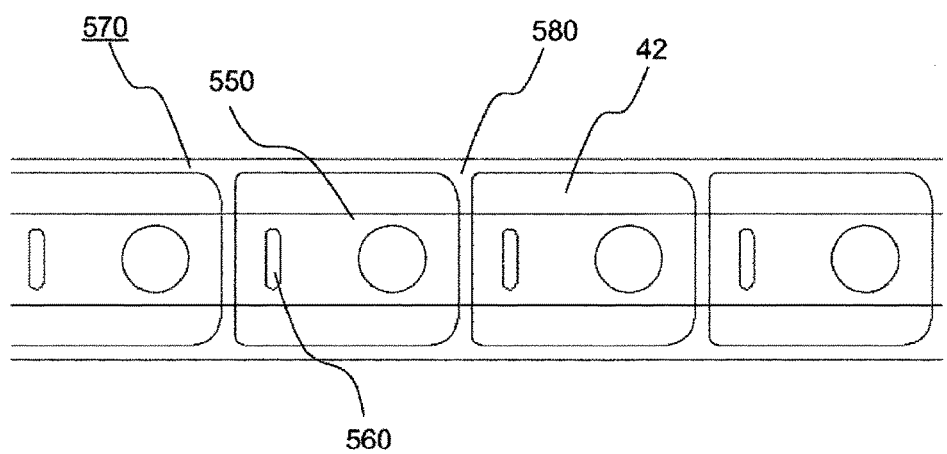
Figure 19:
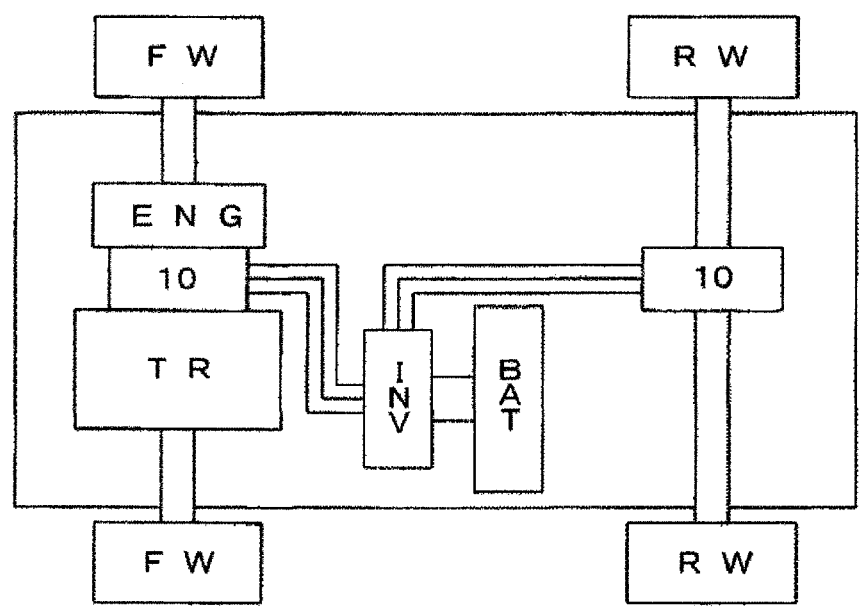

FIG. 11 is a perspective view of a connection terminal.
FIG. 12 is a perspective view of a connection terminal.
FIG. 13 is a perspective view of a connection terminal.
FIG. 14 is a perspective view of a connection terminal.
FIG. 15 is a perspective view of a connection terminal.
FIG. 16 is a developed view of a connection terminal.
FIG. 17 shows a pressing procedure of a connection terminal.
FIG. 18 shows a pressing procedure of a connection terminal.
FIG. 19 is a configuration diagram illustrating a vehicle on which a rotating electric machine is mounted.

DESCRIPTION OF EMBODIMENT

An embodiment of the present invention is hereinafter described with reference to FIGS. 1 through 19.

An example of a rotating electric machine described in the following embodiment is an electric motor utilized for hybrid automobiles. In the following embodiment, an "axial direction" represents a direction with respect to a rotating shaft of the rotating electric machine. A "peripheral direction" represents a direction with respect to a rotating direction of the rotating electric machine. A "radial direction" represents a radius vector direction (radius direction) centering on the rotating shaft of the rotating electric machine. An "internal periphery side" represents the internal side of the radial direction (inside diameter side) while an "external periphery side" represents the opposite direction, that is, the external side of the radial direction (outside diameter side).

Figure 1:
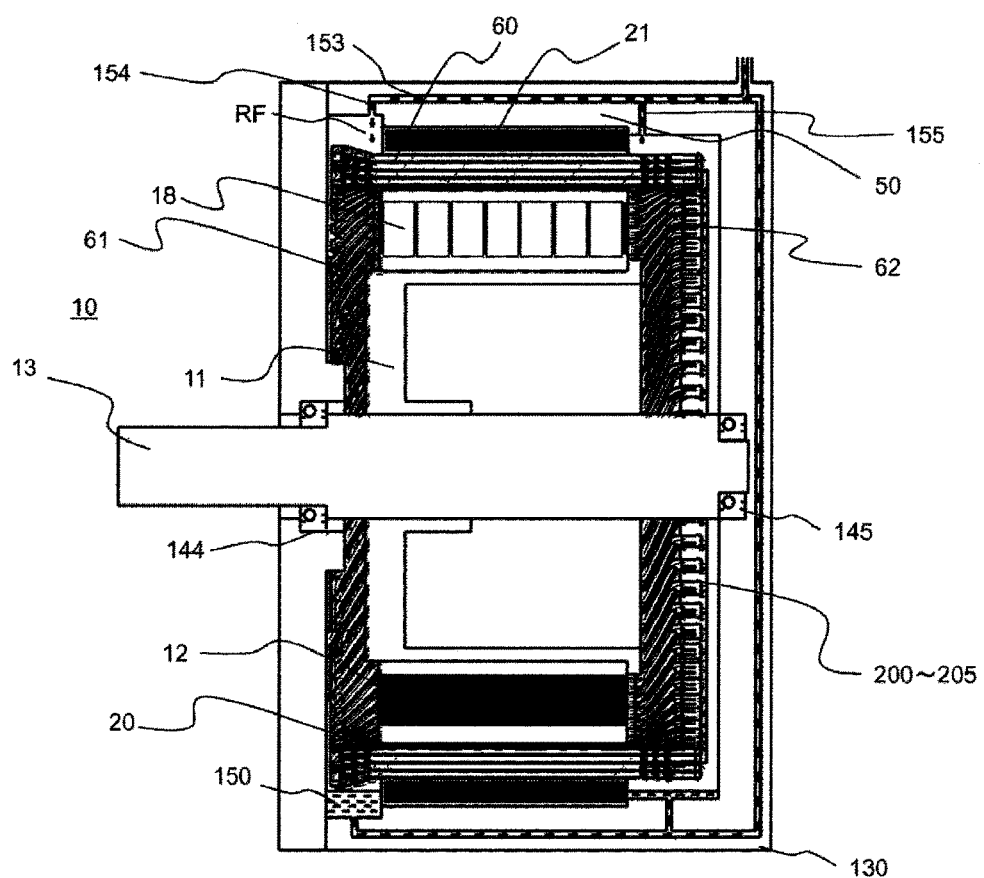
FIG. 1 is a cross-sectional view illustrating an entire configuration of a device of a rotating electric machine.

FIG. 1 is a cross-sectional view illustrating a rotating electric machine including a stator according to the embodiment of the present invention. The rotating electric machine 10 includes a housing 50, the stator 20, a stator core a stator coil 60, and a rotor 11.

The stator 20 is fixed to the internal periphery side of the housing 50. The rotor 11 is rotatably supported in the internal periphery side of the stator 20. The housing 50 is formed in a cylindrical shape by cutting a ferrous metal such as a carbon steel or by casting a cast steel or an aluminum alloy or by press working. The housing 50 is included in an exterior covering of the electric motor. The housing 50 is also referred to as a frame body or a frame.

A liquid cooling jacket 130 is fixed to the external periphery side of the housing 50. A refrigerant path 153 includes an internal wall of the liquid cooling jacket 130 and an external wall of the housing 50. Liquid refrigerant RE such as oil or automatic transmission fluid (ATF) passes through the refrigerant path 153 which is configured not to spill any liquid. The liquid cooling jacket 130 contains bearings 144 and 145, and is also referred to as a bearing bracket.

In a case of direct liquid cooling, the refrigerant RE passes through the refrigerant path 153 and flows out of refrigerant outlets 154 and 155 toward the stator 20 to cool the stator 20. Other examples with no housing 50 may be applicable. Such examples include a configuration where the stator 20 is directly bolted down or shrunk to fit in a case.

The stator 20 includes the stator core 21 and the stator coil 60. Laminae of a silicon steel plate are laminated to form the stator core 21. The silicon steel plate has a thickness ranging from 0.05 to 1.0 mm, and is formed by punching or etching. The stator coil 60 winds around a plurality of slots 15 disposed in an internal part of the stator core 21. Heat generated from the stator coil 60 transfers to the liquid cooling jacket 130 through the medium of the stator core 21, and radiates by the refrigerant RE flowing through the liquid cooling jacket 130.

The rotor 11 includes a rotor core 12 and the rotating shaft 13. Laminae of a silicon steel plate are laminated to form the rotor core 12. The rotating shaft 13 is fixed at the center of the rotor core 12. The rotating shaft 13 is rotatably retained by the bearings 144 and 145 attached to the liquid cooling jacket 130. The rotating shaft 13 rotates with respect to the stator 20 at a predetermined position within the stator 20. Furthermore, a permanent magnet 18 and an end ring (not shown) are disposed in the rotor 11.

Hereinafter, assembly of the rotating electric machine will be described. First, the stator 20 is inserted inside the housing 50 and is attached to the internal wall of the housing 50. Next, the rotor 11 is inserted into the stator 20. Then, a combination of the stator 20 and the rotor 11 is assembled into the liquid cooling jacket 130 so as to fit the bearings 144 and 145 to the rotating shaft 13 of the combination.

Figure 2:
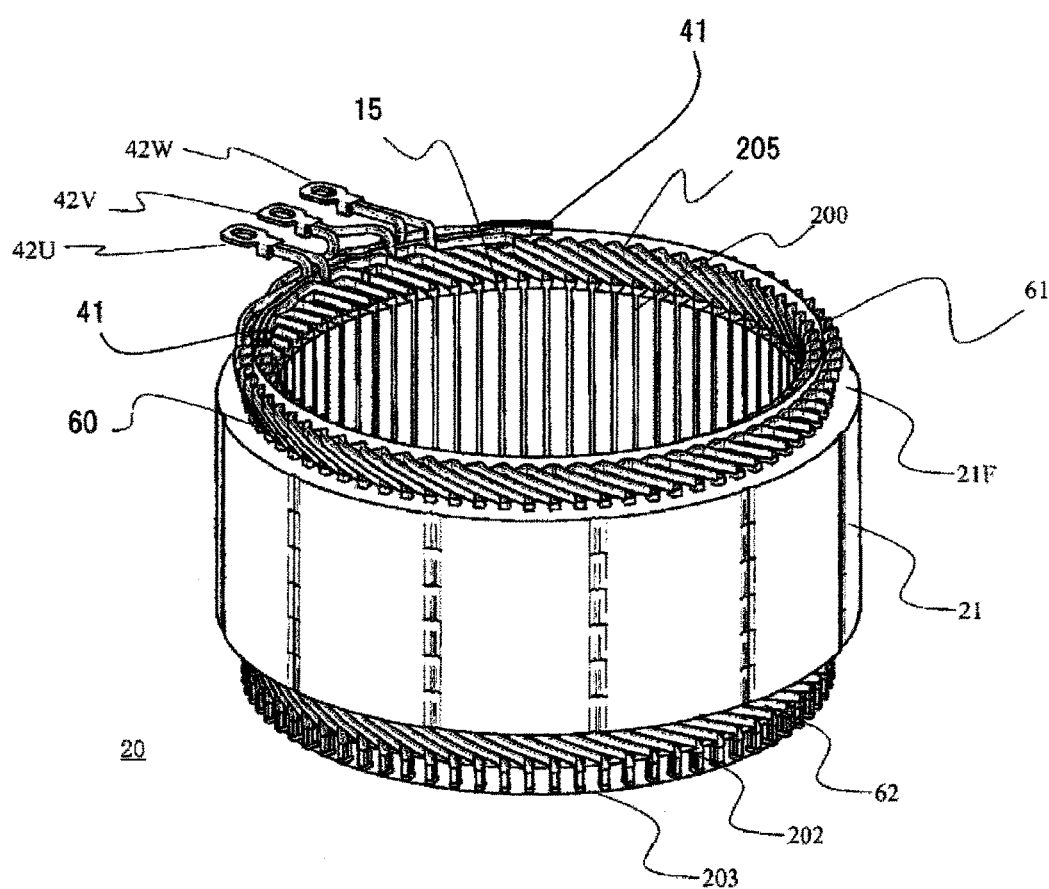
FIG. 2 is a perspective view illustrating a configuration of a stator.

Referring to FIG. 2, configurations of important parts in the stator 20 will be described in detail. The stator 20 includes the stator core 21 and the stator coil 60 winding around the slots 15 disposed in the stator core 21. A conductor having a cross-section in a substantially rectangle shape (in this embodiment, a copper wire) is used in the stator coil 60. Such a conductor improves the efficiency of the rotating electric machine 10 as well as space factor inside the slots.

In the stator core 21, for example, 72 pieces of the slots 15 opened with respect to the inside diameter side are formed in the peripheral direction. A slot liner 200 is provided to each slot 15 so that the stator core 21 and the stator coil 60 are reliably electrically insulated.

The slot liner 200 is formed in a B-shape or S-shape so as to wrap the copper wire. A varnish 205 trickles down and permeates the gaps among the stator core 21, the stator coil 60, and the slot liner 200 to fix those members. A polyester resin or epoxy resin is utilized for the varnish 205.

Other than trickling in the slots 15, the varnish 205 may also be applied to coil ends 61 and 62, if necessary. Application methods of the varnish 205 may include a trickle impregnation method using a nozzle or a method wherein the stator is immersed in a surface of the varnish.

In each of the coil ends 61 and 62, an insulating paper 203 is annularly disposed between segment conductors thereof. An object of the insulating paper 203 is phase-to-phase insulation and conductor-to-conductor insulation. In the stator 10, the insulating paper 203 is disposed in each of the coil ends 61 and 62. Therefore, the stator 10 can retain necessary dielectric strength voltage even though the insulating film is damaged or deteriorated. The insulating paper 203 is, for example, an insulating sheet of a heat-resistant polyamide paper having a thickness ranging from 0.1 to 0.5 mm. It should be noted that the insulating paper 203 may not be disposed in a case that an insulation distance can be ensured due to working voltage or a thickness of an enamel film.

Figure 3A:
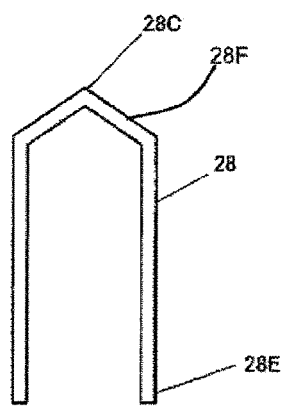
FIGS. 3A-3C are views showing segment conductors of a stator coil.
Figure 3B:
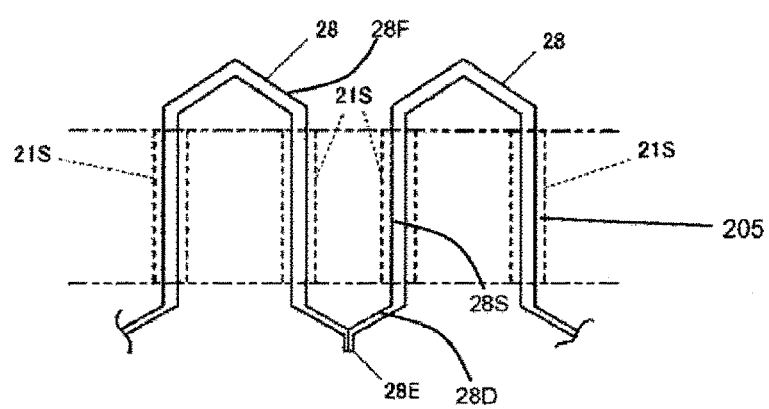
Figure 3C:
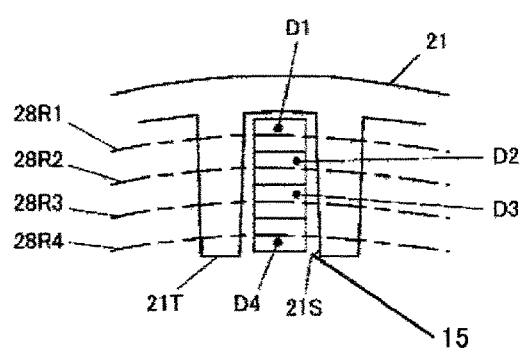

Referring to FIG. 3, a winding method of the stator coil 60 will be briefly described. The copper wire or an aluminum wire insulated by enamel and the like and having a substantially rectangle cross-section will be formed into a segment conductor as shown in FIG. 3(a). The segment conductor 28 is substantially shaped in a U-shape as turning down at a point of an unwelded side of the coil end apex 28C. Herein, the unwelded side of the coil end apex 28C may be in a shape where a direction of the conductor is turned down to make a substantial U-shape. In other words, seeing from a radial direction, it is not restricted to a substantial triangle shape, as shown in FIGS. 3(a) to 3(c), formed by the unwelded side of the coil end apex 28C and a conductor inclined portion 28F of the unwelded side of the coil end. For example, with regard to a part of the unwelded side of the coil end apex 28C, the shape of the conductor may be substantially parallel to an end surface of the stator core 21 (seeing from the radial direction, the shape of the unwelded side of the coil end apex 280 and the conductor inclined portion 28F of the unwelded side of the coil end may be substantially trapezoidal).

The segment conductor 28 is inserted into the stator slot from the axial direction. Another segment conductor 28 inserted into a place apart from the predetermined slot 15 and a conductor welding portion 28E are connected as shown in FIG. 3(b). Examples of the connecting methods include a welding, a liquid phase-solid phase reaction bonding method, and a solid phase bonding method.

At this moment, a conductor straight portion 28S and a conductor inclined portion 28D are formed in the segment conductor 28. The conductor straight portion 28S is a portion which is to be inserted into the slot 15, while the conductor inclined portion 28D is a portion which inclines with respect to the conductor welding portion 28E of the mating segment conductor. The segment conductors are inserted into the slots in multiples of two (two, four, six and so on). FIG. 3(c) shows an example that four segment conductors are inserted in one slot. Since the conductor herein has substantially rectangle cross-section, it is possible to improve the space factor inside the slot, which leads to improvement in efficiency of the rotating electric machine.

Figure 4:
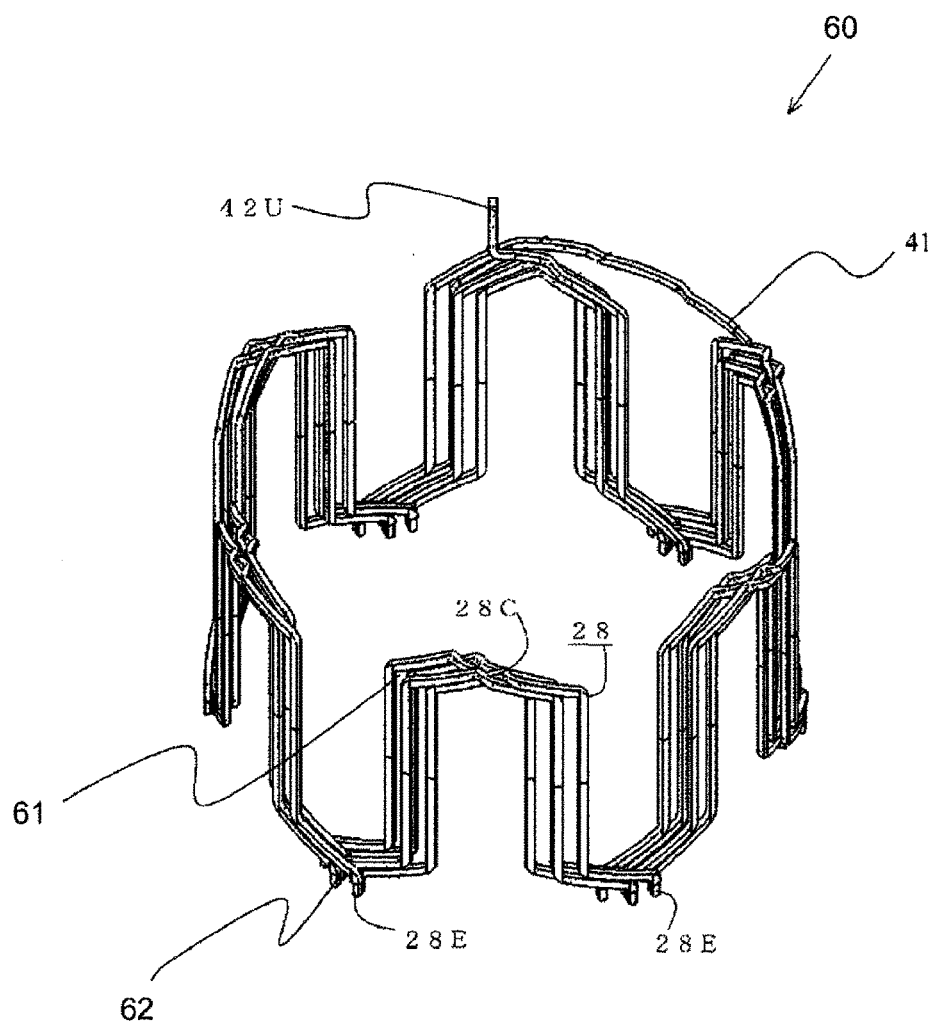
FIG. 4 is a perspective view of a U-phase stator coil.

FIG. 4 is a view showing that one phase (U-phase, for example) of the coil 60 is formed as repeatedly performing the connecting work shown in FIG. 3(b) till the segment conductors become annular. One phase of the coil 60 is configured so as to assemble the conductor welding portions 28E in one direction with respect to the axial direction. Such a configuration forms a welded side of the coil end 62 where the conductor welding portions 28E are assembled and the unwelded side of the coil end 61 where the unwelded sides of the coil end apexes 28C are assembled. In one phase of the coil 60, each phase terminal. (U-phase terminal 42U in the example shown in FIG. 4) is formed on one end, and a neutral line 41 is formed on another end.

The stator coil 60 is connected by a star connection or delta connection. According to the embodiment of the present invention, the stator coil 60 having a two-star arrangement will be adopted. The arrangement has two star connections connected in parallel. The input/output coil conductors 42U, 42V, 42W of each of the three phases, U, V, W and a neutral point connection conductor 41 are led out of the stator coil 60. In other words, the stator coil 60 is configured to connect main parts of the stator coil of each phases, U-phase, V-phase, W-phase with each of the input/output coil conductors 42U, 42V, 42W respectively and the neutral point connection conductor 41. In each leading end of each of the input/output coil conductors 42U, 42V, 47W, provided is a connection terminal 42 to be hereinafter described. Being fastened to an external system with a bolt and the like, the connection terminals 42 connects the external system and the input/output coil conductors.

Figure 5:
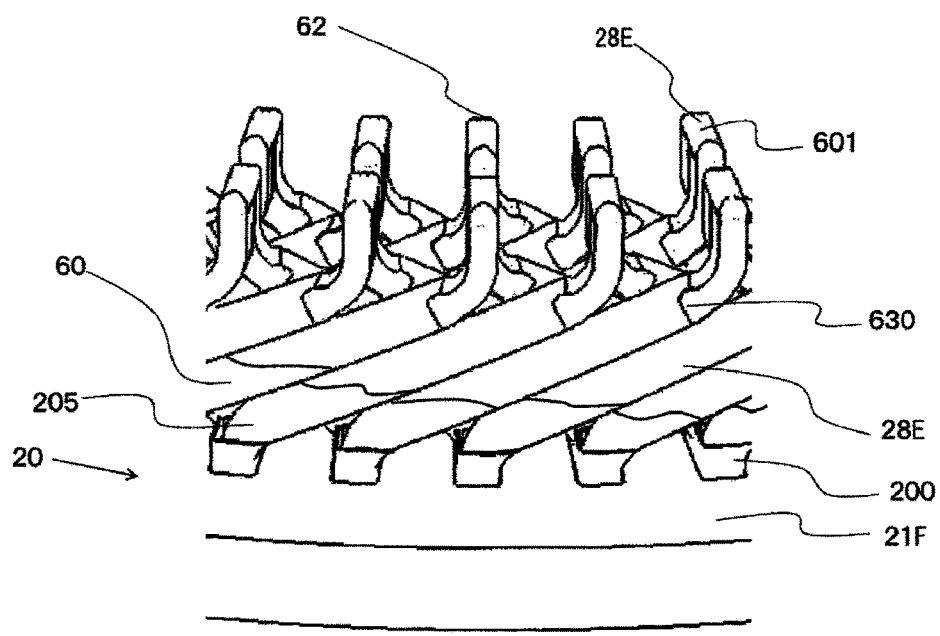
FIG. 5 is a perspective view illustrating a state that a bolt is fastened tightly to a connection terminal.

Referring to FIG. 5, the welded side of the coil end 62 will be described in details. The conductor welding portions 28E of the stator coil 60 are exclusively coated with a resin member 601. It is preferable that the resin member 601 covers the conductor welding portions 28E substantially evenly. For example, a preferable average thickness of the resin member 601 ranges from 5 to 40 μm. Examples of the resin member 601 include a novolac-type epoxy resin, a polyamide-imide resin, a polyimide resin, an acrylic resin, a polybutadiene resin, an alkyd resin, and a polyester resin. However, it is not restricted to these materials and other materials may be applicable on condition that they have insulation properties.

The varnish 205 trickles into the slot liner 200 and fixes the stator core 21, the stator coil 60, and the slot liner 200. The varnish 205 may be attached to the resin member 601. In a case that the necessary insulation properties can be obtained, there is no need to cover the resin member 601 with the varnish since the resin member itself has sufficient insulation properties.

Figure 6:
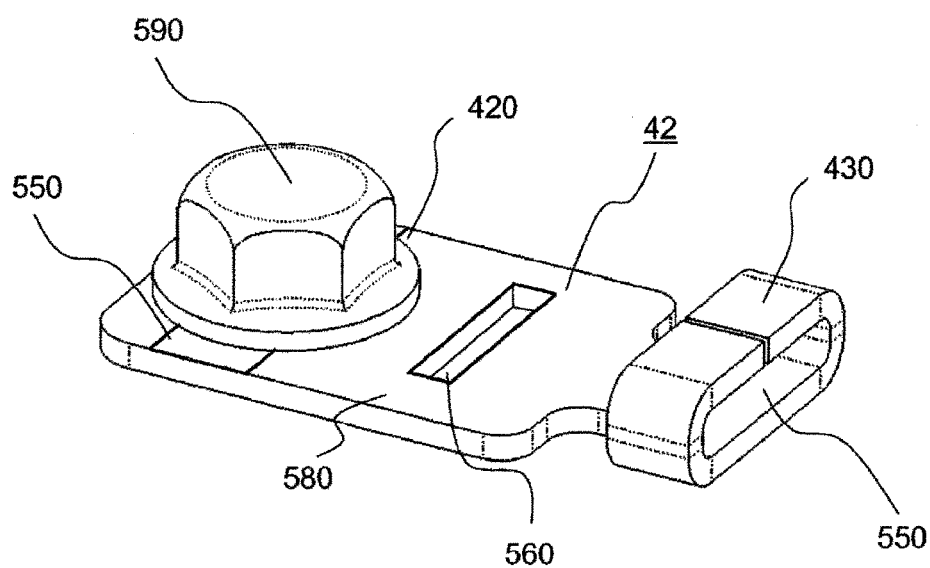
FIG. 6 is a perspective view illustrating a state that a bolt is fastened tightly to a connection terminal.

Referring to FIGS. 6 and 16, the connection terminal 42 will be described. FIG. 16 shows the connection terminal 42 before being formed, while FIG. 6 shows a state that a bolt 590 is fastened tightly to the formed connection terminal 42. The connection terminals 42 are cut out from a belt-like material 570 as shown in FIG. 17 by punching press working or wire cutting. As shown in FIG. 16, the connection terminal 42 includes a fastening portion 420 and a pressure connection portion 430. The fastening portion 420 is mechanically connected (for example, fastened with the bolt 590) to the external system. The pressure connection portion 430 is connected to each of the input/output coil conductors 42U, 42V, 42W by pressure connection. The connection terminal 42 includes a basic material 580 which is an oxygen-free copper or aerobic copper. In the fastening portion 420 and the pressure connection portion 430, a melting material. 550 which is a brazing material is provided. As shown in FIG. 16, the melting material 550 is provided so as to stretch in a side direction of the fastening portion 420 and the pressure connection portion 430 (a direction orthogonal to a direction connecting the fastening portion 420 and the pressure connection portion 430).

The pressure connection portion 430 of the connection terminal 42 before being formed as shown in FIG. 16 is bended so that a surface where the melting material 550 is disposed faces inward. Then, the pressure connection portion 430 is formed in a tubulous shape as shown in FIG. 6. A preferable bending R is equivalent to a plate thickness or a radius ranging from 0.5 to 2 mm in order to prevent peeling of the brazing material. However, bending at a right angle may be applicable. It is possible to make the bending R smaller when a bending direction is set to be orthogonal to a rolling direction of the belt-like material 570 (in other words, a longitudinal direction of the melting material 550).

The melting material 550 is disposed in the fastening portion 420. The melting material 550 (for example, the brazing material) has intensity higher than that of the basic material 580, which is effective in reducing deformation of the fastening portion 420 when the bolt 590 is bolted down. A metal harder than the basic material may take the place of the melting material 550 to be provided to the fastening portion 420. However, in a case of providing the melting material 550, it is effective in improving productivity that is to be hereinafter described. Furthermore, if a material having a low resistivity is used as the melting material 550 (or as the metal harder than the basic material that is to be provided to the fastening portion 420), internal resistance can be suppressed to improve the efficiency of the rotating electric machine.

Figure 7:
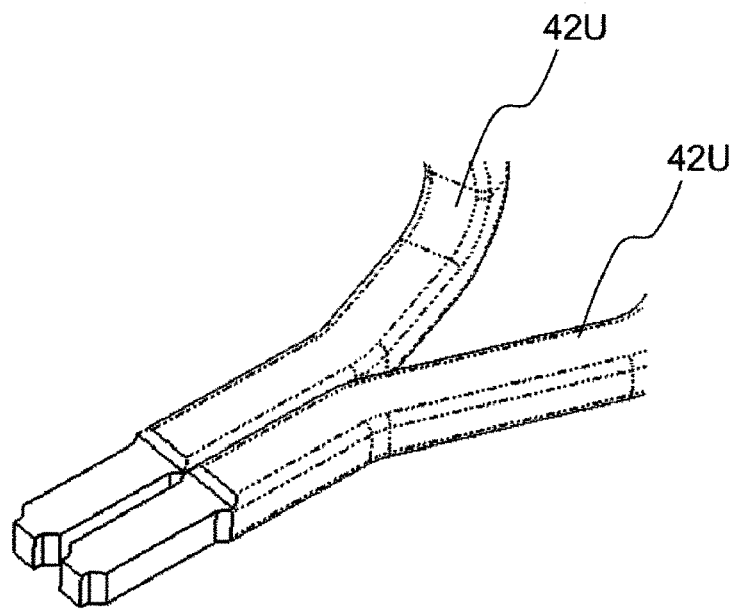
FIG. 7 is a perspective view illustrating a state before a plurality of straight angle coils is attached to a connection terminal.

FIG. 7 shows a state before each of the input/output coil conductors 42U, 42V, 42W is being attached to the connection terminal 42. FIG. 7 shows a state that an enamel film is eliminated from the leading end of each of the input/output coil conductors 42U, 42V, 42W.

Figure 8:
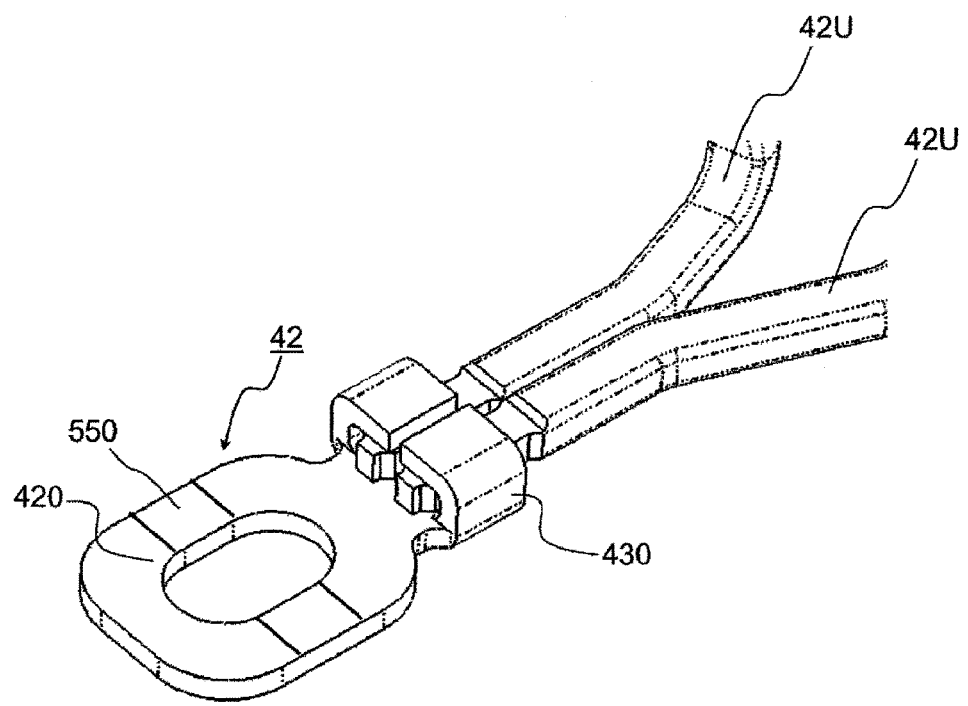
FIG. 8 is a perspective view illustrating a state of a connection terminal being attached to a plurality of straight angle coils.

FIG. 8 shows a state that each of the input/output coil conductors 42U, 42V, 42W is attached to the connection terminal 42. A portion of the leading end of each of the input/output coil conductors 42U, 42V, 42W where the enamel film is eliminated is inserted into the tube-shaped pressure connection portion 430 of the connection terminal 42. The portion is mechanically and electrically connected to the connection terminal 42. Herein, the portion is connected by brazing of a liquid phase-solid phase reaction bonding method.

Noted that by heating the enamel film by energization without eliminating the enamel film from the leading end of each of the input/output coil conductors 42U, 42V, 42W, it is also possible to fuse and discharge the enamel film and bring (or weld) the enamel film into contact with the coil conductor and make them connect electrically.

Figure 9:
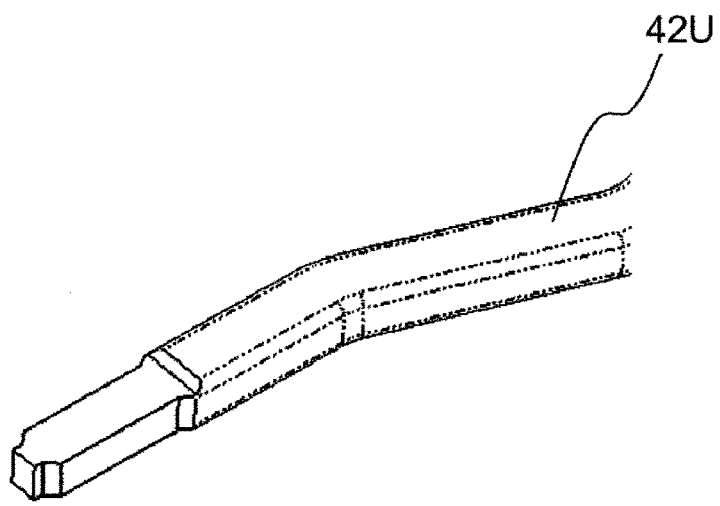
FIG. 9 is a perspective view illustrating a state of a connection terminal being attached to a straight angle coil.

FIG. 9 shows a state before each of the input/out coil conductors 42U, 42V, 42W is attached to the connection terminal 42. FIG. 9 is basically similar to the case that has been described referring to FIG. 7 except that FIG. 9 shows a case of inserting one coil.

Figure 10:
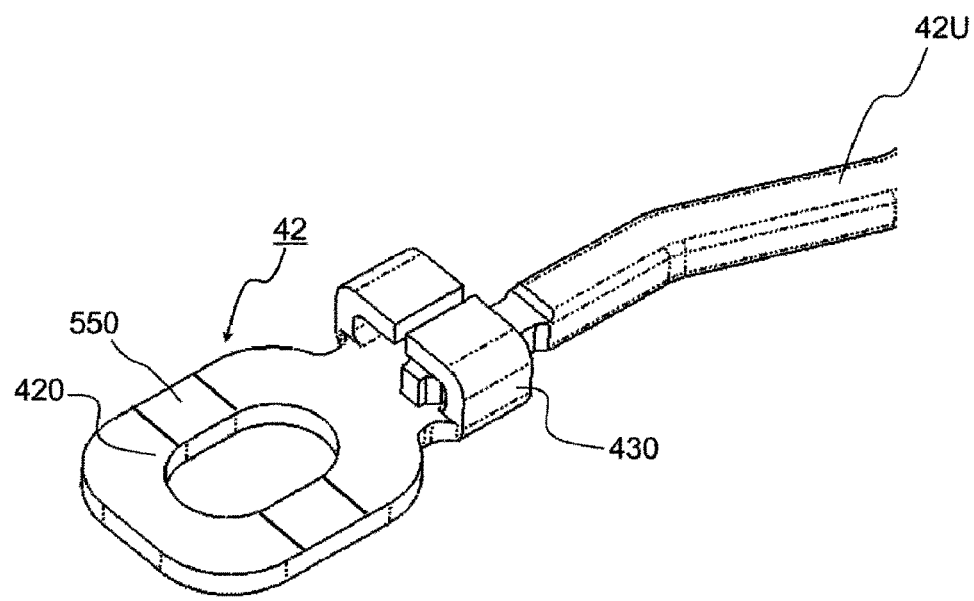
FIG. 10 is a perspective view illustrating a state before a straight angle coil is attached to a connection terminal.

FIG. 10 is a perspective view showing a state where one of the input/output coil conductors 42U, 42V, 42W shown in FIG. 9 is attached to the connection terminal 42. Herein, what is shown is a case of attaching one of the input/output coil conductors 42U, 42V, 42W whose enamel film of the leading end is eliminated. Heating the enamel film by energization without eliminating the enamel film, it is also possible to fuse and discharge the enamel film and bring (or weld) the enamel film into contact with the coil conductor and make them connect electrically.

FIG. 11 is a perspective view of the connection terminal 42. A chamfer 432 is provided in an inlet of the pressure connection portion 430 so that the input/output coil conductors 42U, 42V, 42W can easily be inserted. The chamfer 432 may be formed when the connection terminal 42 is punched out from the belt-like material 570 by press working.

FIG. 12 is an example showing the melting material 550 of the fastening portion 420 stretches extensively. The melting material 550 is disposed in a width that covers the entire contact surface of the bolt 590. Therefore, deformation of the basic material can be reduced in wider area.

FIG. 13 is an exemplary view where forming (bending process) of the pressure connection portion 430 of the connection terminal 42 is omitted. In this example, the pressure connection portion 430 is not tubulous but planate and has a configuration where each of the input/output coil conductors 42U, 42V, 42W is attached to one surface.

FIG. 14 is another example where forming (bending process) of the pressure connection portion 430 is omitted as similar to FIG. 13. The example herein shows that the connection terminal 42 is cut out so that the fastening portion 420 and the pressure connection portion 430 line up in the rolling direction of the belt-like material 570 (in other words, in the longitudinal direction of the melting material 550), as shown in FIG. 18. Therefore, as shown in FIG. 14, the melting material 550 is disposed so as to connect the fastening portion 420 and the pressure connection portion 430. Each of the input/output coil conductors 42U, 42V, 42W is attached to one side of the pressure connection portion 430.

FIG. 15 is a view of the connection terminal 42 showing that the melting material 550 is disposed so as to connect the fastening portion 420 and the pressure connection portion 430, as similar to the example shown in FIG. 14. In the example shown herein, the pressure connection portion 430 is formed in a tubulous shape and the melting material 550 is not provided to portions where the pressure connection portion 430 is bended the melting material. 550 is provided only to planar portions of the pressure connection portion 430). Accordingly, it is possible to reduce deformation and peeling of the melting material 550 due to bending formation, and to improve reliability of the connection terminal 42.

FIG. 16 shows a shape before forming the connection terminal 42, as mentioned before.

FIG. 17 is a layout showing a process of manufacturing the connection terminals 42. Herein, the connection terminals 42 are cut off from the belt-like material 570 in such a situation that the pressure connection portion 430 of one connection terminal 42 and the fastening portion 420 of another connection terminal 42 are alternately arranged in the longitudinal direction of the belt-like material 570. In the belt-like material 570, the melting material 550 is buried in the basic material 580 so that the surface of the basic material 580 and the surface of the melting material 550 become coplanar. The basic material 580 is a copper plate having a plate thickness of about 1.5 mm, while the melting material 550 is a material with a belt-like shape having a width ranging from 1 to 5 mm and a plate thickness of about 0.1 mm. Herein, two melting materials 550 are buried in parallel to the longitudinal direction of the belt-like material 570. Disposing the melting material 550 in this manner, even though adjacent two connection terminals are disposed so as to face up and down inversely to each other (in other words, the pressure connection portion 430 of one connection terminal 42 and the fastening portion 420 of another connection terminal 42 are disposed to be arranged alternately in the longitudinal direction of the belt-like material 570), the melting material 550 can be disposed in the fastening portion 420 and the pressure connection portion. 430 of the both connection terminals 42. As a result, it is possible to effectively produce the connection terminals 42 from the belt-like material 570 and to obtain an effect of improvement in productivity.

Herein, the melting material 550 is the brazing material. More specifically, BCuP-5 (15Ag-5P—Cu) is used because of an advantage that it can braze without a flux thanks to its self-flux effect. Naturally, BCuP-1 to 6 may be used properly in accordance with its use. Other examples of the brazing material include a seam-welded material or a material obtained by rolling and forming a copper plate having a plate thickness of about 1.5 mm and a copper-phosphorus-brazing leaf 5(15Ag-5P—Cu) having a width of about 3 mm and a plate thickness of about 0.1 mm. In this manner, by burying the melting material 550 to make the surface of the basic material 580 and the surface of the melting material 550 be coplanar, the surface of the melting material 550 and the surface of the connection terminal 42 become coplanar. Therefore, it is possible to reduce hitch when inserting each of the input/output coil conductors 42U, 42V, 42W into the pressure connection portion 430. Noted that the oxygen-free copper or aerobic copper is used in the basic material 580.

FIG. 18 is a layout showing a process of manufacturing the connection terminals 42. Herein, the connection terminals 42 are cut off from the belt-like material 570 in such a situation that the pressure connection portion 430 of one connection terminal 42 and the fastening portion 420 of another connection terminal 42 are alternately arranged in the longitudinal direction of the belt-like material 570. Even in one connection terminal 42 shown in the layout herein, the fastening portion 420 thereof and the pressure connection portion 430 thereof are alternately arranged in the longitudinal direction of the belt-like material 570 (in other words, the longitudinal direction of the melting material 550). Therefore, the melting material 550 is disposed so as to connect the fastening portion 420 and the pressure connection portion 430.

The rotating electric machine of a permanent magnet type has been described so far. However, the embodiment of the present invention is applied not only to the permanent magnet type but also to an induction type, a synchronous reluctance, a pawl magnetic pole type, and the like. Furthermore, the winding method herein is a wave winding method, but other winding methods having similar characteristics (for example, concentrated winding or concentric winding) are applicable. In addition, an inward rotating type is described herein, but an outward rotating type is also applicable.

Referring to FIG. 19, a vehicle mounting the rotating electric machine 10 according to the embodiment of the present invention will be described. FIG. 19 shows a power train of a hybrid automobile basing on a four-wheel driving. The vehicle herein includes an engine ENG and the rotating electric machine 10 as a primum mobile of a front-wheel side. A transmission TR provides gear change to power generated from the engine ENG and the rotating electric machine 10, and transmits the power to drive wheels FW in the front-wheel side. In driving rear wheels, the rotating electric machine 10 disposed in a rear-wheel side and drive wheels RW in the rear-wheel side are mechanically connected to transmit the power.

The rotating electric machine 10 starts the engine and switches a generation of driving force and power-generating capacity in accordance with a traveling situation of the vehicle. The power-generating capacity collects energy as electric energy when decelerating the vehicle. Driving and power-generating operations of the rotating electric machine 10 are controlled by a power converter INV in order to optimize a torque and rotation number in accordance with a driving situation of the vehicle. Electric power necessary for driving the rotating electric machine 10 is supplied from a battery BAT through the medium of the power converter INV. Furthermore, during the power-generating operation of the rotating electric machine 10, the battery BAT is charged with the electric energy through the medium of the power converter INV.

Herein, the rotating electric machine 10 is a power source of the front-wheel side. The rotating electric machine 10 is disposed between the engine ENG and the transmission TR and includes the configurations described as referring to FIGS. 1 through 18. With regard to a drive power source of the rear-wheel side, the rotating electric machine 10 may include configurations similar to those of the rotating electric machine 10 in the front-wheel side. Other rotating electric machines with usual configurations can also be used. Naturally, the rotating electric machine 10 is applicable in hybrid vehicles other than the four-wheel driving vehicle.

In the aforementioned embodiment, the stator coil including the segment conductor has been described. However, the embodiment of the present invention is naturally applicable to a connection terminal which is connected to an input/output coil conductor of a stator coil including a continuity conductor. Furthermore, the embodiment of the present invention is applicable to a connecting conductor which mechanically connects the conductor and the external system as well as the connecting conductor for the stator coil of the rotating electric machine.

It should be noted that the present invention is not restricted to the aforementioned embodiment and various modifications may be included. For example, aforementioned embodiment has been described in detail to give clear descriptions to the present invention. It should not be restricted to the one that includes the whole configurations described in the embodiment. Furthermore, with regard to a part of the configurations described in the embodiment, addition, deletion, or replacement of other configurations are applicable.

REFERENCE SIGNS LIST

10 rotating electric machine
11 rotor
12 rotor core
13 rotating shaft
15 slot
20 stator
21 stator core
28 segment conductor
28C unwelded side of the coil end apex
28D conductor inclined portion
28E conductor welding portion
28F conductor inclined portion
41 neutral line
42 connection terminal
42U U-phase terminal
42V V-phase terminal
42W W-phase terminal
50 housing
60 stator coil
61 coil end
62 coil end
130 liquid cooling jacket
144 bearing
145 bearing
153 refrigerant path
154 refrigerant outlet
155 refrigerant outlet
200 slot liner
203 insulating paper
205 varnish
420 fastening portion
550 melting material
560 slot
580 basic material
590 bolt
601 resin member
RF refrigerant

The invention claimed is:

1. A stator of a rotating electric machine with a stator coil, comprising:
   a connection terminal including a pressure connection portion and a fastening portion, the pressure connection portion being connected to an input/output coil conductor of the stator coil, the fastening portion being mechanically connected to an external system, wherein a melting material is disposed in the fastening portion.

2. The stator of the rotating electric machine according to claim 1, wherein the input/output coil conductor is connected to the connection terminal through the medium of the melting material disposed in the pressure connection portion.

3. The stator of the rotating electric machine according to claim 2, wherein the melting material is buried in a basic material of the connection terminal so that a surface of the basic material and a surface of the melting material become coplanar.

4. The stator of the rotating electric machine according to claim 3, wherein the melting material is in a belt-like shape and stretches with respect to a side direction of the pressure connection portion and the fastening portion or a direction where the pressure connection portion and the fastening portion are brought into contact.

5. The stator of the rotating electric machine according to claim 1, wherein the melting material is a brazing material.

6. A rotating electric machine comprising the stator according to claim 1.

7. A manufacturing method for a stator of a rotating electric machine with a stator coil, wherein the stator includes a connection terminal including a pressure connection portion and a fastening portion, the pressure connection portion being connected to an input/output coil conductor of the stator coil, the fastening portion being mechanically connected to an external system,
   wherein the connection terminal is cut off from a belt-like material buried with a belt-like melting material in a longitudinal direction so that the melting material is disposed in both the pressure connection portion and the fastening portion.

8. The manufacturing method for the stator of the rotating electric machine according to claim 7, comprising:
burying two or more of the melting materials in the belt-like material; and
cutting off the connection terminals from the belt-like material in such a state that the pressure connection portion of one connection terminal and the fastening portion of another connection terminal are alternately arranged in the longitudinal direction of the belt-like material.

9. The manufacturing method for the stator of the rotating electric machine according to claim 7, comprising:
alternately arranging the pressure connection portion of one connection terminal and the fastening portion of another connection terminal in the longitudinal direction of the belt-like material; and
cutting off the connection terminals from the belt-like material in such a state that the melting material is disposed so as to connect the pressure connection portion and the fastening portion of one connection terminal.

10. The manufacturing method for the rotating electric machine comprising the stator recited in claim 1.

* * * * *